Dec. 1, 1959 G. E. KEEFER 2,915,342
BEARING STRUCTURE WITH GAS-TIGHT SEAL
Filed Jan. 5, 1956

Inventor
GEORGE E. KEEFER
By Rule and Hoge
Attorneys

//  # United States Patent Office

2,915,342
Patented Dec. 1, 1959

2,915,342

BEARING STRUCTURE WITH GAS-TIGHT SEAL

George E. Keefer, Toledo, Ohio, assignor to Owens-Illinois Glass Company, a corporation of Ohio Application January 5, 1956, Serial No. 557,546

4 Claims. (Cl. 308—77)

My invention relates to bearings for shafts and other moving or motion transmitting elements, particularly where subjected to high temperatures. The invention in its preferred form is used with shafts journalled in graphite bearings and provides means by which air and gases are prevented from coming in contact with heated portions of the shaft and its bearings.

Prior art structures comprising graphite in situations where they are subjected to high temperatures, deteriorate from the atmospheric air entering the structure either along the shaft or between the graphite bearing material and the support in which it is mounted. An object of the invention is to provide a structure for protecting the heated bearing parts from contact with the ambient air or other gases, thereby preventing deterioration.

In the preferred embodiment of the invention as herein illustrated, bearing structures in accordance with my invention are used in connection with a rotary shaft for stirring molten glass. The shaft bearings are mounted in the side walls of a channel structure through which molten glass flows, the shaft being immersed in the glass and having attached thereto stirring elements working in the glass. My invention provides a structure including graphite bearings for the shaft and a metal retainer for the graphite by which air is prevented from reaching the outside surface of the graphite bearing. The retainer may be in the form of a tube or cylinder surrounding the bearing and air tight throughout its length. The inner end of the retainer is sealed gas tight by the molten glass in contact therewith. The outer end of the retainer is sealed gas tight by an end plate which may be bolted or secured in place and sealed by a gas-tight gasket. A gas-tight seal is also provided between the shaft and the retainer end plate by the use of a commercial bearing seal.

A further object of the invention is to provide means by which the temperatures of those portions of the shaft and its bearings which are exposed to air or other gases, are kept below destructive temperatures. For this purpose the invention provides means for water cooling the portions of the shaft surrounded by the graphite bearings.

A further object of the invention is to provide cooling means for keeping the temperature of the bearings and sealing means low enough to permit lubrication to be applied.

Other objects of the invention will appear hereinafter.

Referring to the accompanying drawings which illustrate the invention as used in connection with the forehearth of a glass melting and refining tank:

Figure 1:
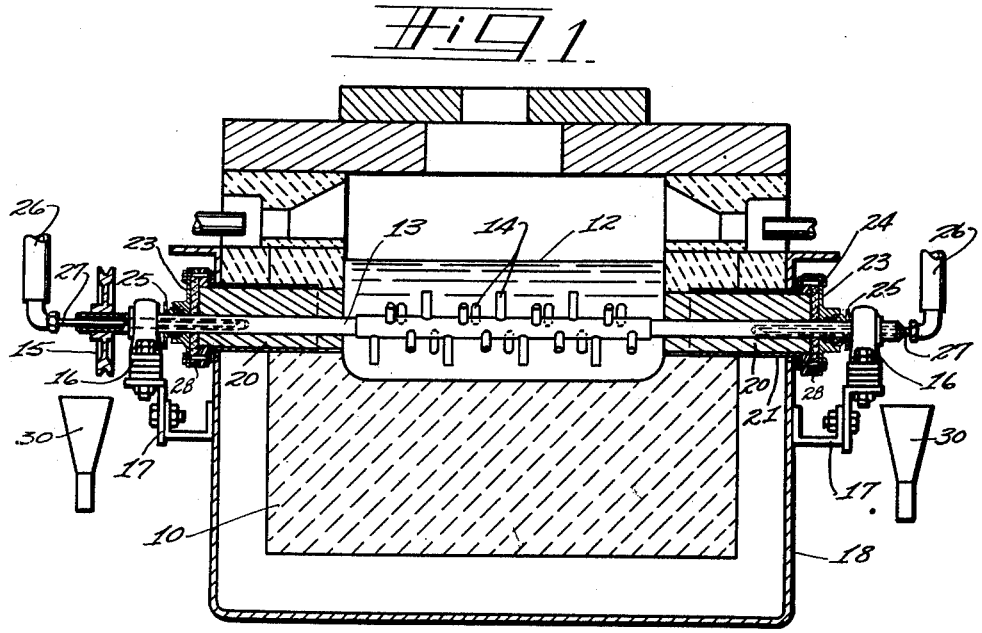
Fig. 1 is a cross sectional elevation of the forehearth, showing a stirring shaft and its bearings mounted therein.
Figure 2:
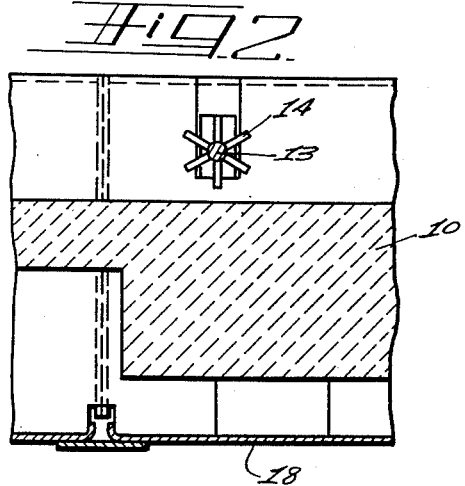
Fig. 2 is a fragmentary longitudinal sectional elevation of the forehearth and the stirring shaft.

The furnace forehearth, which as shown is of well-known construction, comprises a body 10 of refractory material, formed with a channel through which molten glass 12 flows from a glass melting and refining tank to the outer end of the channel where the glass is withdrawn.

A device for stirring the glass comprises a shaft 13 extending transversely of the channel through the body of molten glass 12. Stirring rods 14 are attached to and extend radially from the shaft. The shaft is rotated continuously by means of a power driven pulley or gear 15 attached to the shaft. The shaft may be supported in outer bearings 16 mounted on brackets 17 attached to the metal framework 18 in which the refractory body 10 is supported.

Figure 3:
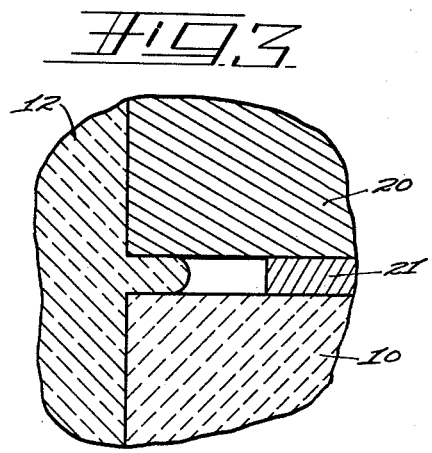
Fig. 3 is a fragmentary sectional view on a larger scale illustrating the sealing of the graphite bearing by the molten glass.

Graphite bearings 20 through which the shaft 13 extends are mounted in the side walls of the channel body 10. In order to prevent air from reaching the outer surfaces of the graphite bearings, each bearing is surrounded by a heat resisting metal retainer 21. The retainer is tubular or cylindrical and forms a sleeve in immediate contact with the bearing and extending substantially throughout the full length of the bearing. The inner end of each retainer 21 may be either in contact with the molten glass or spaced therefrom as shown in Fig. 3, and which thereby forms an air-tight seal preventing access of air either to the outer surface of the graphite bearing or between the bearing at its inner end and the shaft 13. The outer end of the graphite bearing is sealed gas tight by an end plate 23 attached to the retainer by bolts 24, with a gas-tight sealing gasket 28 interposed between the end plate 23 and the retainer 21. This construction prevents access of the ambient air to the outer end surface of the graphite bearing. A gas-tight seal is provided between the shaft 13 and the retainer end plate 23 by the use of a seal 25 which may be a commercial seal of known construction.

The molten glass 12 being at a high temperature tends to heat exposed portions of the shaft and its bearings and sealing means to destructive temperatures. The present invention provides means for maintaining the shaft and its bearings below such destruction temperatures. For this purpose the end portions of the shaft are made hollow to provide cooling chambers for the circulation therein of a cooling fluid, preferably water. The water is transmitted through a rubber hose 26 having connected to its discharge end a nozzle in the form of a pipe 27 which extends lengthwise within the hollow shaft. The tube 27 and hollow portion of the shaft extend through the seal 25 to the interior of the graphite bearing 20. The cooling fluid may flow continuously, thereby preventing overheating of the bearings and seal. The water as it is discharged from the hollow shaft falls through a funnel 30 into a drain pipe. By means of the cooling fluid the temperature of the shaft 13, where it emerges from the sealing means and is exposed to the outside air, is maintained below its destruction temperature. The cooling water also lowers the temperature of the seal sufficiently to permit lubrication.

By reference to Fig. 3 it will be seen that the molten glass 12 provides a seal between the graphite bearing 20 and the refractory material of the channel body 10. The inner end of the metal retainer 21 may be spaced outwardly from the body of glass 12 as shown without interfering with the formation of a gas-tight seal between the glass and the graphite bearing.

Modifications may be resorted to within the spirit and scope of my invention.

I claim:

1. The combination of a shaft, a graphite bearing through which the shaft extends, a refractory wall formed with an opening extending therethrough in which the bearing is mounted, the said bearing extending entirely through the wall at said opening and extending beyond the wall at one side thereof, a metal sleeve surrounding the said graphite bearing and interposed between the bearing and the surrounding wall surface of said opening and extending through said opening and to the extended end of said bearing, said sleeve having a close fit within said opening and around said bearing, an end plate attached to said sleeve at the extended end of the sleeve and formed with an opening through which the shaft extends, and means forming an air-tight seal between said shaft and end plate, and between said end plate and said metal sleeve, said sealing means comprising a gas-tight sealing gasket positioned between said sleeve and end plate and lying against the inner face of said end plate and against the end of said sleeve, and means for clamping the sealing gasket between the said end plate and sleeve.

2. The combination set forth in claim 1, including a second bearing separate from said graphite bearing and through which the said shaft extends, and means for mounting said second bearing in proximity to the graphite bearing to provide a support for the said shaft.

3. The combination of a shaft, a graphite bearing block through which the shaft extends, a wall of refractory material forming a support in which said bearing block is mounted, said wall having an opening therethrough into and through which the bearing block extends, a metal sleeve mounted within said opening and through which the shaft extends, said sleeve surrounding and closely fitting the graphite bearing block and having a close fit within the surrounding wall surface of said opening, means providing a seal between the bearing block and said sleeve and between the bearing block and said shaft, the shaft comprising a tubular portion extending through the sealing means and within said bearing block and its support, means for circulating a cooling liquid through said tubular portion of the shaft, an auxiliary bearing adjacent the graphite bearing and in which the said shaft is journalled, and means for mounting and supporting the auxiliary bearing in a fixed position relative to the graphite bearing.

4. The combination with a container having side walls of refractory material and a metal supporting framework supporting the container, said side walls having openings therethrough, of a shaft extending through said openings and outwardly beyond the side walls, graphite bearings mounted in said openings, the shaft being journalled in said graphite bearings, metal sleeves mounted in said openings and surrounding said bearings, said sleeves having a close fit within said openings and also closely fitting said bearings, the said graphite bearings and metal sleeve being extended outwardly beyond the outer surfaces of said side walls, plates attached to said metal sleeves at the outer ends of the sleeves and sealing gaskets interposed between the said metal plates and sleeves and forming a gas-tight fit between the shaft and the said sleeves, auxiliary bearings in which said shaft is mounted and means for attaching the auxiliary bearings to said framework and holding them in fixed position relative to the container, said auxiliary bearings being in close proximity to the graphite bearings and providing a support for the shaft.

References Cited in the file of this patent

UNITED STATES PATENTS

| | | |
|---|---|---|
| 1,815,473 | Harding et al. | July 21, 1931 |
| 1,816,758 | Adams | July 28, 1936 |
| 2,059,889 | Morton | Nov. 3, 1936 |
| 2,093,800 | May | Sept. 21, 1937 |
| 2,132,867 | Davis | Oct. 11, 1938 |
| 2,239,228 | Hankison | Apr. 22, 1941 |
| 2,516,021 | Samzelius | July 18, 1950 |
| 2,751,210 | Ludwig | June 19, 1956 |

FOREIGN PATENTS

| | | |
|---|---|---|
| 573,728 | Great Britain | Dec. 4, 1945 |
| 864,620 | Germany | Jan. 26, 1953 |